(12) United States Patent
Moriyama et al.

(10) Patent No.: US 8,792,150 B2
(45) Date of Patent: Jul. 29, 2014

(54) METHOD FOR STORING A PROFILE SET, A COMPUTER READABLE RECORDING MEDIUM STORED WITH A PROFILE SET STORAGE PROGRAM, A PROFILE SET STORAGE SYSTEM, AND A COLOR CONVERSION PROCESS DEVICE

(75) Inventors: Tomotaka Moriyama, Hino (JP); Masahiro Ozawa, Machida (JP)

(73) Assignee: Konica Minolta Business Technologies, Inc. (JP)

( * ) Notice: Subject to any disclaimer, the term of this patent is extended or adjusted under 35 U.S.C. 154(b) by 311 days.

(21) Appl. No.: 13/118,249

(22) Filed: May 27, 2011

(65) Prior Publication Data
US 2011/0273733 A1 Nov. 10, 2011

(30) Foreign Application Priority Data

Jun. 9, 2010 (JP) ................................. 2010-132127
May 9, 2011 (JP) ................................. 2011-104082

(51) Int. Cl.
*G03F 3/08* (2006.01)
*H04N 1/60* (2006.01)

(52) U.S. Cl.
CPC ............... *H04N 1/60* (2013.01); *H04N 1/6019* (2013.01); *H04N 1/6027* (2013.01)
USPC .......... 358/523; 358/1.9; 358/3.23; 358/1.13; 358/1.16; 358/518

(58) Field of Classification Search
None
See application file for complete search history.

(56) References Cited

U.S. PATENT DOCUMENTS

| 5,710,871 | A  | * | 1/1998  | Tadenuma et al. | 358/1.9 |
| 5,806,081 | A  | * | 9/1998  | Swen et al.     | 715/202 |
| 6,362,808 | B1 | * | 3/2002  | Edge et al.     | 345/601 |
| 6,525,721 | B1 | * | 2/2003  | Thomas et al.   | 345/600 |
| 6,642,931 | B1 | * | 11/2003 | Haikin et al.   | 345/601 |
| 6,681,041 | B1 | * | 1/2004  | Stokes et al.   | 382/164 |
| 7,035,454 | B2 | * | 4/2006  | Kumada et al.   | 382/162 |
| 7,129,958 | B2 | * | 10/2006 | Newman et al.   | 345/604 |
| 7,206,094 | B2 | * | 4/2007  | Kumada et al.   | 358/1.16 |
| 7,483,172 | B2 | * | 1/2009  | Hung            | 358/1.9 |
| 7,557,957 | B2 | * | 7/2009  | Kumada et al.   | 358/1.9 |
| 7,599,634 | B2 | * | 10/2009 | Kuo et al.      | 399/45  |
| 7,706,604 | B2 | * | 4/2010  | Berns et al.    | 382/162 |
| 7,764,411 | B2 | * | 7/2010  | Kishimoto       | 358/518 |
| 2004/0046979 | A1 | * | 3/2004 | Stevens         | 358/1.9 |

(Continued)

FOREIGN PATENT DOCUMENTS

| JP | 2002-187314 | 7/2002 |
| JP | 2003-274102 | 9/2003 |

(Continued)

*Primary Examiner* — Richard Zhu
(74) *Attorney, Agent, or Firm* — Squire Patton Boggs (US) LLP

(57) ABSTRACT

The method of storing profile set storage method according to the present invention comprising (a) selecting as reconstruction data that enables to reconstruct a profile set, either size prioritized data, which is smaller than said profile set, or reconstruction speed prioritized data, which enables to be reconstructed within a shorter time period than is required for reconstructing the size prioritized data, and which is smaller than the profile set but is larger than the size prioritized data; (b) for generating the selected reconstruction data based on the profile set; and (c) storing the reconstruction data generated in the step (b) in a storage device.

15 Claims, 14 Drawing Sheets

(56) References Cited

U.S. PATENT DOCUMENTS

| | | | |
|---|---|---|---|
| 2004/0246527 A1* | 12/2004 | Kakutani | 358/3.01 |
| 2007/0139674 A1* | 6/2007 | Kawano et al. | 358/1.9 |
| 2009/0168108 A1* | 7/2009 | Matsushima | 358/3.06 |
| 2009/0199166 A1 | 8/2009 | Sakata | |
| 2010/0220926 A1* | 9/2010 | Monga et al. | 382/166 |
| 2010/0277753 A1 | 11/2010 | Shinchi | |

FOREIGN PATENT DOCUMENTS

| | | |
|---|---|---|
| JP | 2008-048434 | 2/2008 |
| JP | 2009-181558 | 8/2009 |
| JP | 2010-263368 | 11/2010 |

* cited by examiner

FG.12A
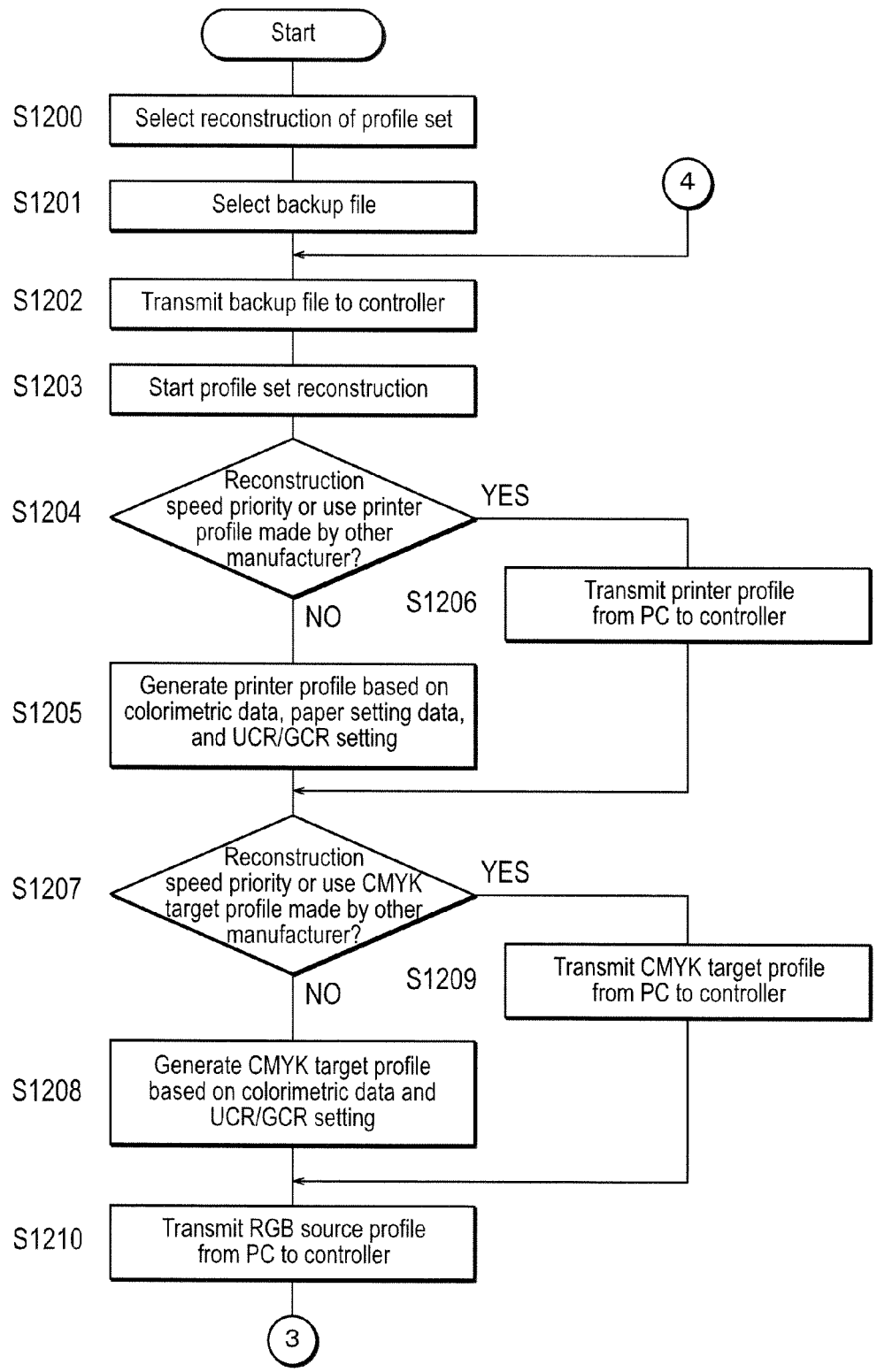

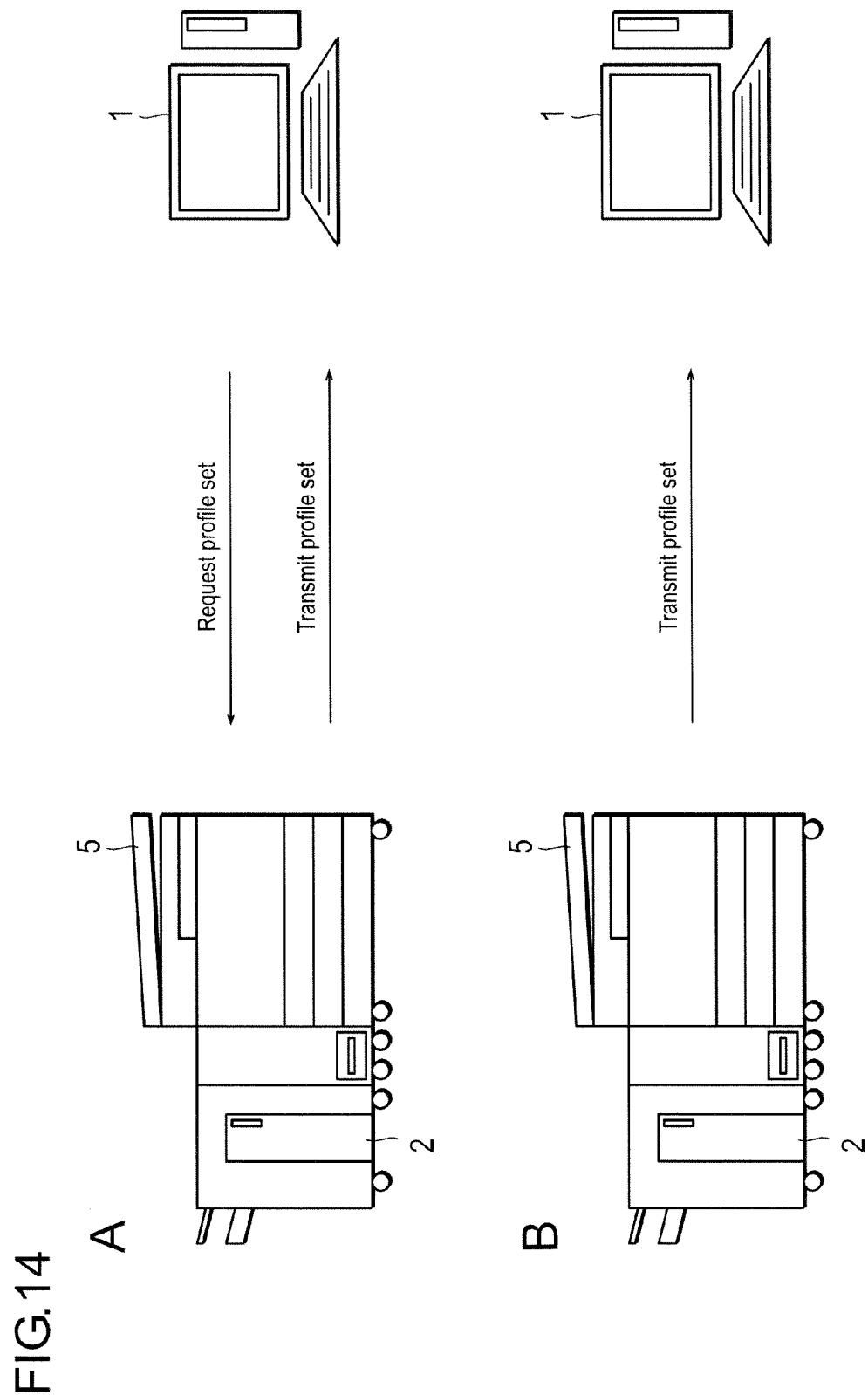

METHOD FOR STORING A PROFILE SET, A COMPUTER READABLE RECORDING MEDIUM STORED WITH A PROFILE SET STORAGE PROGRAM, A PROFILE SET STORAGE SYSTEM, AND A COLOR CONVERSION PROCESS DEVICE

CROSS-REFERENCE TO RELATED APPLICATION

This application is based on Japanese Patent Application No. 2010-132127 filed on Jun. 9, 2010, and No. 2011-104082 filed on May 9, 2011, the contents of which are incorporated herein by reference.

BACKGROUND

1. Technical Field

The present invention relates to a method of storing a profile set, a computer readable recording medium stored with a profile set storage program, a profile set storage system, and a color conversion process device.

2. Description of Related Art

There is a need for adjusting colors of image data considering the color space characteristics unique to each of digital equipment when transmitting color images between digital equipment such as a personal computer, a printer and a digital camera. Color conversion profile having a color conversion table is used for adjusting colors of image data. As a related technology, there is what is called a "profile set" that makes it possible to conduct color conversion using the profile suitable for a type of paper to be used for printing as well as for each object type of images to be printed by means of preparing and packaging a profile unique to each object type (image, graphic, or text type) of the images, and relating it to a specific paper type.

Since this profile set is stored in a storage device (memory) of an image processing apparatus, a method of backing up a profile set and reconstructing it as a means of restoration in case the storage device is damaged and lose the profile set is proposed.

As disclosed in Unexamined Japanese Patent Publication No. 2002-187314, there is another related technology, in which a prepared profile and various condition used in the preparation of the profile are stored in a memory in order to control the history of preparation of the prepared profile.

However, the aforementioned technology backs up the profile as is, so that there is a problem that it is difficult to reduce the capacity of the storage device (memory) where the backup is made.

SUMMARY

The present invention is made to solve such a problem and intends to reduce the amount of data to be stored in the storage device and to shorten the time required for reconstructing the profile set.

To achieve at least one of the aforementioned objects, a method for storing a profile set reflecting one aspect of the present invention comprises:

(a) selecting as reconstruction data that enables to reconstruct a profile set having at least one kind of color conversion profile for converting color of an image, either size prioritized data, which is smaller than said profile set, or reconstruction speed prioritized data, which enables to be reconstructed within a shorter time period than is required for reconstructing said size prioritized data, and which is smaller than said profile set but is larger than said size prioritized data;

(b) generating said reconstruction data selected in said step (a) based on said profile set; and (c) storing said reconstruction data generated in said step (b) into a storage device.

The aforementioned method of storing a profile set preferably further comprises: either a step (d1) for transferring said profile set prior to said step (b), or a step (d2) for transferring the reconstruction data generated in said step (b) prior to said step (c), wherein said storage device to which said reconstruction data is stored in said step (c) is a storage device to which said profile set or said reconstruction data is transmitted in said step (d1) or said step (d2).

In the aforementioned method of storing a profile set, said size prioritized data preferably includes colorimetric data for printer profile, colorimetric data for CMYK target profile, and RGB source profile.

In the aforementioned method of storing a profile set, said reconstruction speed prioritized data preferably includes printer profile, CMYK target profile, and RGB source profile.

The aforementioned method of storing a profile set preferably further comprises (e) reconstructing said profile set based on said reconstructing data stored in said storage device in said step (c).

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 12A is a flowchart for describing the reconstruction process of the profile set.

FIG. 14 is a explanatory diagram for sending/receiving the profile set between the PC 1 and the printer controller 2 during the backup of the profile set.

DETAILED DESCRIPTION

The method of storing a profile set, the computer readable recording medium stored with the profile set storage program, the profile set storage system, and the color conversion process device in accordance with an embodiment of the present invention are described in detail below with reference to the accompanying drawings.

Figure 1:
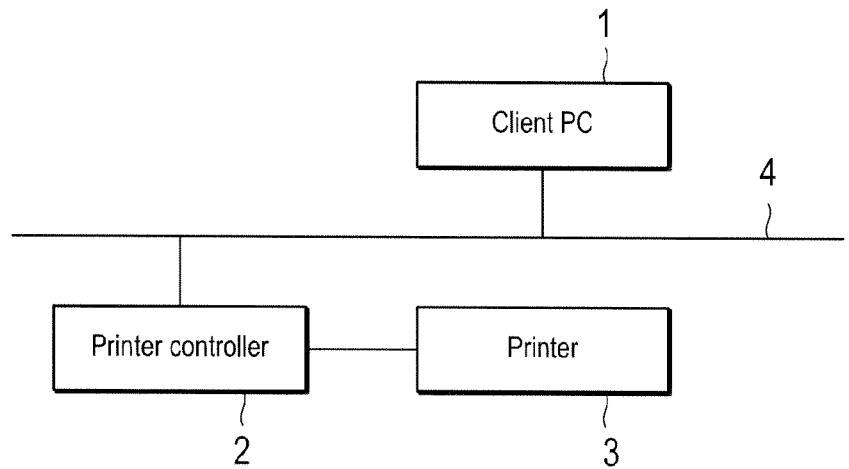
FIG. 1 is a block diagram of printing system having a printer controller, a printer, and a client PC related to an embodiment of the present invention.

FIG. 1 is a block diagram of a printing system (profile set storage system) having a printer controller (color conversion process device) 2, a printer 3, and a client PC (client computer, hereinafter referred to PC (personal computer)) 1.

The PC 1 and the printer controller 2 are connected in order to communicate with each other via a network 4. The network 4 consists of a LAN (Local Area Network) that connects computers and network equipment with each other based on standards such as Ethernet, TokenRing, and FDDI, or a WAN (Wide Area Network) that connects LANs via dedicated lines. The printer controller 2 and the printer 3 are connected with each other via a dedicated interfacing bus such as IEEE1394 serial bus and USB (Universal Serial Bus). However, the printer controller 2 and the printer 3 can be connected via the network 4. An MFP (Multifunction Peripheral) is constituted with the printer controller 2 and the printer 3.

The types and quantities of equipment to be connected to the network 4 are not limited to the example shown in FIG. 1.

Figure 2:
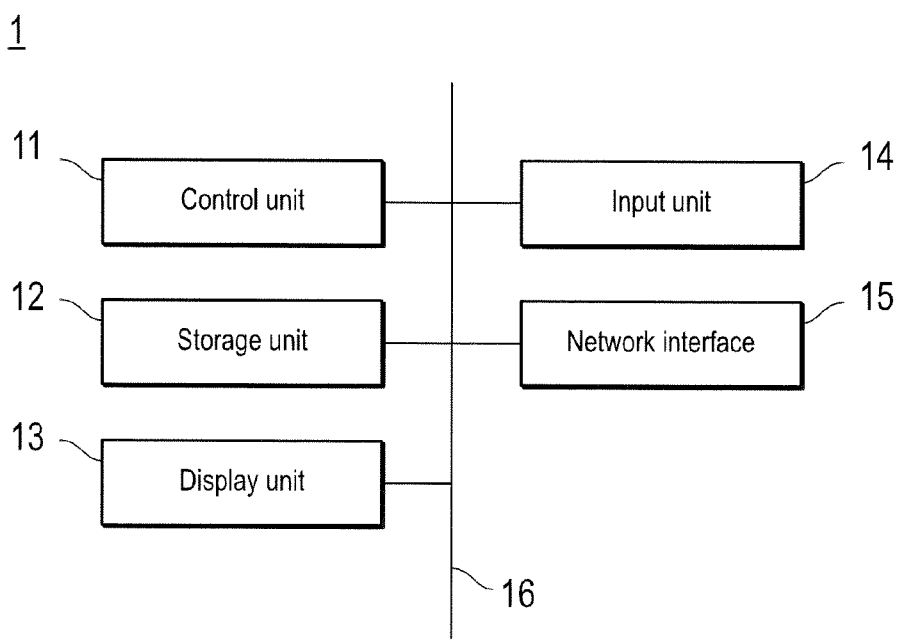
FIG. 2 is a block diagram showing the configuration of the PC shown in FIG. 1.

FIG. 2 is a block diagram showing the configuration of the PC 1 shown in FIG. 1.

The client PC 1 is comprised of a control unit 11, a storage unit 12, a display unit 13, an input unit 14, and a network interface 15, all of which are mutually connected via bus 16 for exchanging signals.

The control unit 11 is comprised of a CPU (Central Processing Unit), controls each unit mentioned above, and conducts various arithmetic processes according to a program. The storage unit 12 is comprised of a ROM (Read Only Memory) for storing various programs and data in advance, a RAM (Random Access Memory) for storing programs and data temporarily as a working area, and a hard disk for storing various programs including the operating system and data.

The display unit 13 is typically a liquid crystal display capable of displaying various types of information. The input unit 14 includes a pointing device such as a mouse or a keyboard, and is used for entering various input data.

The networking interface 15 is an interface for communicating with external equipment, and an network interface according to standards such as Ethernet, TokenRing, and FDDI, a serial interface such as USB and IEEE1394, a parallel interface such as SCSI (Small Computer System Interface) and IEEE1284, a wireless communication interface such as BlueTooth (registered trademark), IEEE802.11, HomeRF (Home Radio Frequency), and IrDA (Infrared Data Association), a telephone circuit interface for connecting with telephone circuits, etc. are available.

Figure 3:
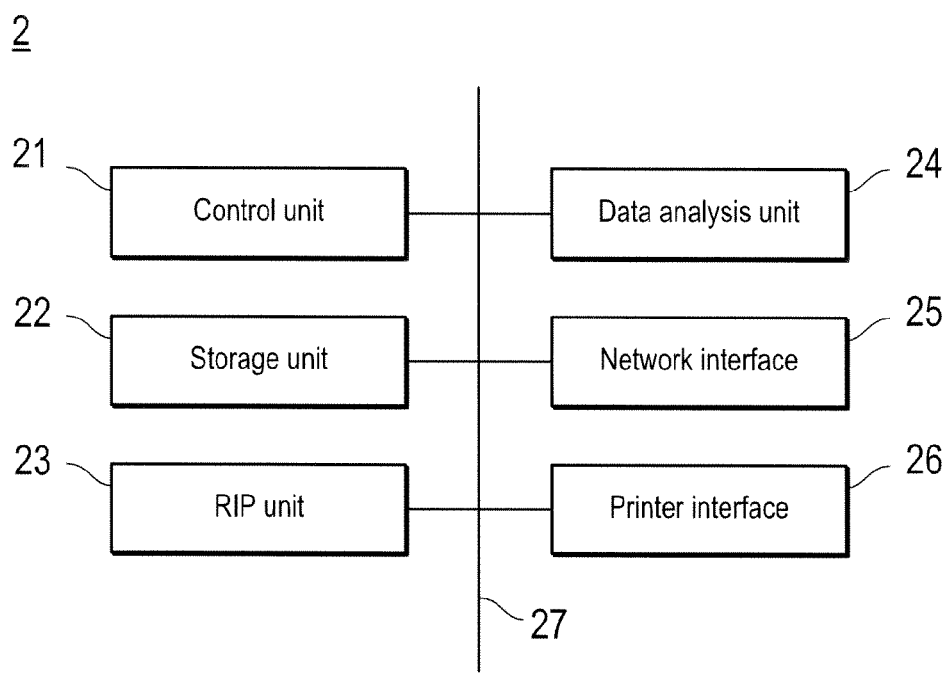
FIG. 3 is a block diagram showing the configuration of the printer controller shown in FIG. 1.

FIG. 3 is a block diagram showing the configuration of the printer controller 2 shown in FIG. 1.

The printer controller 2 is comprised of a control unit 21, a storage unit 22, a RIP (Raster Image Processor) unit 23, a data analysis unit 24, a network interface 25, and a printer interface 26, all of which are connected via bus 27 for exchanging signals. In order to avoid redundancy, the description of those units amongst the aforementioned units of the printer controller 2 having the identical functions as those of the PC 1 is omitted here.

The RIP unit 23 executes a rasterizing process for developing the print data received from the PC 1 to image data of the bitmap format. The data analysis unit 24 analyzes the method of processing the print data. The printer interface 26 is an interface for communicating with the locally connected printer 3.

Figure 4:
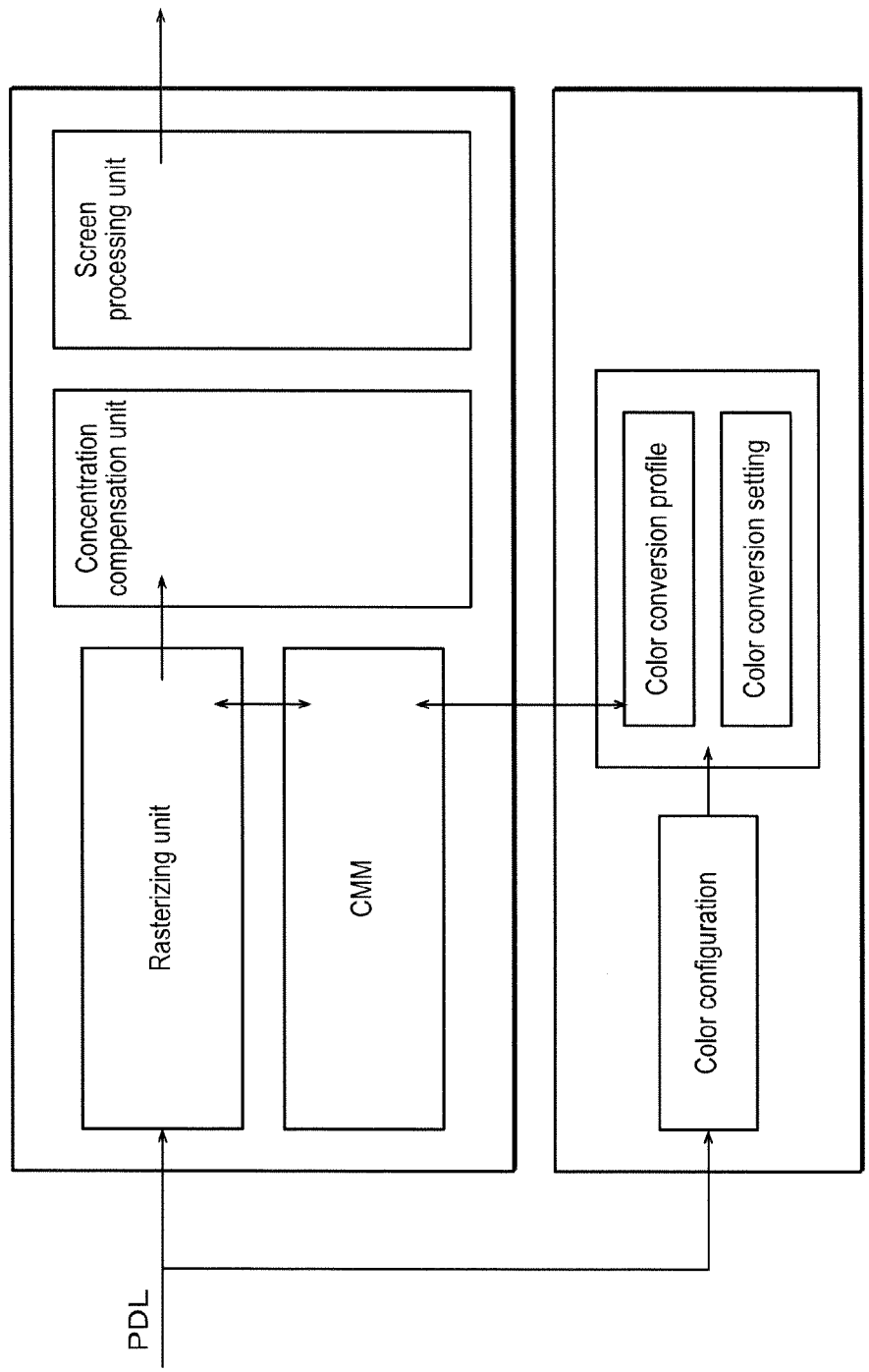
FIG. 4 is a block diagram showing conceptually the operation of the RIP unit of the printer controller shown in FIG. 3.

FIG. 4 is a block diagram conceptually showing the operation of the RIP unit 23 of the printer controller 2 shown in FIG. 3. As shown in FIG. 4, the RIP unit 23 is comprised of a rasterizing unit, a CMM (Color Management Module), a concentration compensation unit, and a screen processing unit. The print data (PDL (Page Description Language) data) contained in a print job received from the client PC 1 generates image data of the bitmap format by a rasterizing process at the rasterizing unit. A color conversion process is applied to the image data generated in the rasterizing unit by the CMM using the color conversion profile specified in the print job. A concentration compensation process and a screen process are applied on the color converted image data sequentially, and the image data generated as a result is transmitted to the printer 3.

Figure 5:
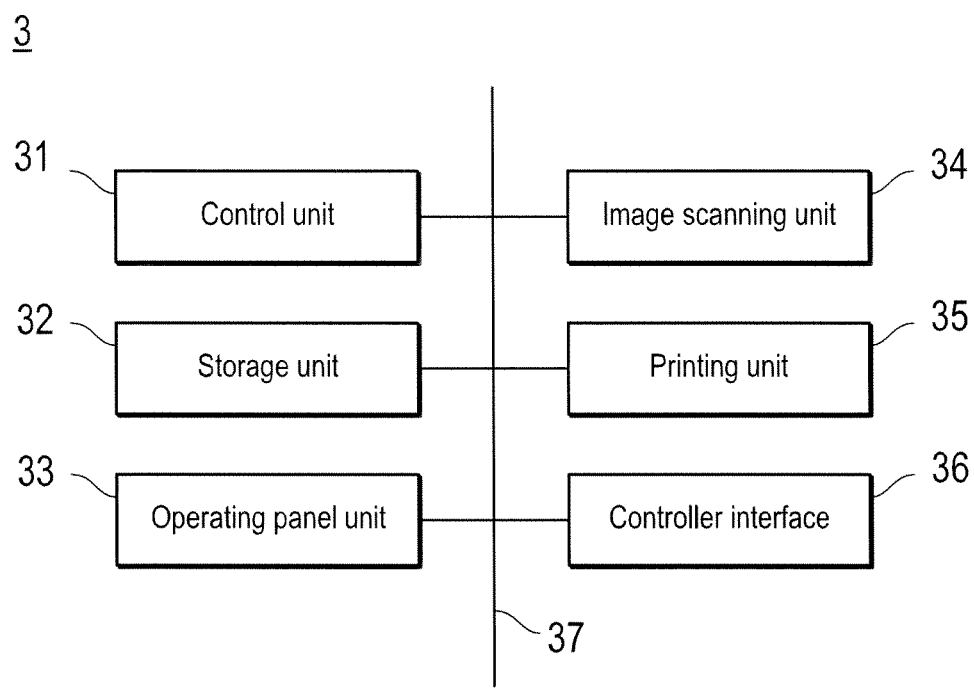
FIG. 5 is a block diagram showing the configuration of the printer 3 shown in FIG. 1.

FIG. 5 is a block diagram showing the configuration of the printer 3 shown in FIG. 1.

The printer 3 is comprised of a control unit 31, a storage unit 32, an operating panel unit 33, an image scanning unit 34, a printing unit 35, and a controller interface 36, all of which are connected via bus 37 for exchanging signals. In order to avoid redundancy, the description of those units amongst the aforementioned units of the printer 3 having the identical functions as those of the PC 1 is omitted here.

The storage unit 32 is stored with a printing process program to be executed based on the image data of the bitmap format received from the printer controller 2. The operating panel unit 33 is comprised of a touchscreen, a numeric key pad, start button, stop button, etc., and is used for displaying various kinds of information and entering various instructions.

The image scanning unit 34 irradiates a document set on a specified scanning position of a document table or a document transported by an ADF (Auto Document Feeder) to a specified scanning position with light from a light source, e.g., a fluorescent lamp, and receives reflected light in order to generate digital data of the document image, scanning it by means of a CCD (Charge Coupled Device) image sensor, a CMOS (Complementary Metal Oxide Semiconductor) image sensor, etc.

The printing unit 35 prints the image based on the image data received from the printer controller 2 on a recording media such as a sheet of paper using the known imaging process, e.g., the electronic photographing process, etc. The controller interface 36 is an interface for communicating with the locally connected printer controller 2.

Figure 6:
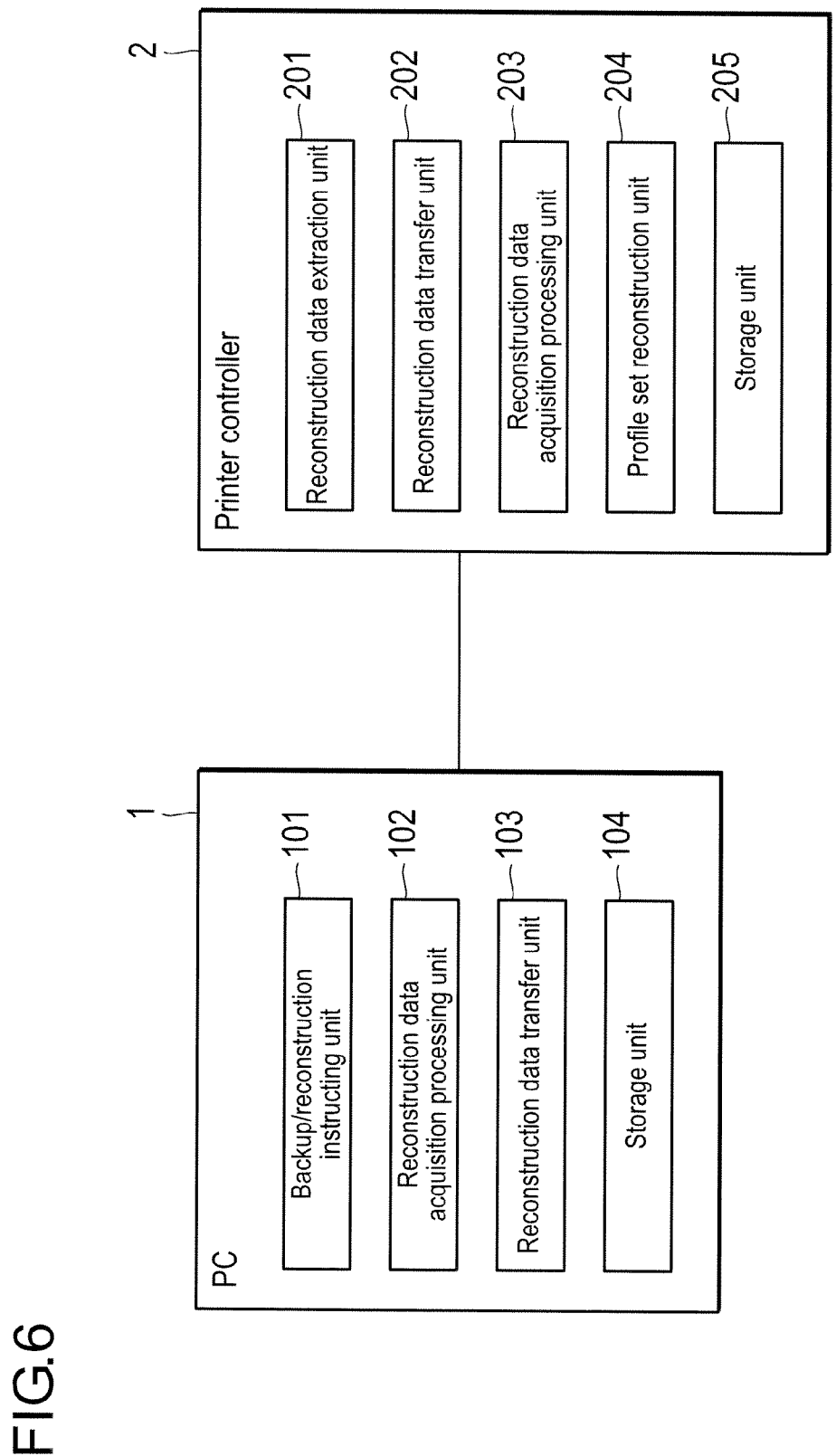
FIG. 6 is a functional block diagram of a printing system according to an embodiment of the present invention.

FIG. 6 is a functional block diagram of a printing system according to an embodiment of the present invention. This figure is a functional block diagram showing each function to realize storing and reconstructing the profile set, while these functions can be materialized by various constituting elements of the PC 1 and the printer controller 2 shown in FIG. 2 and FIG. 3.

The PC 1 comprises a backup/reconstruction instructing unit 101, a reconstruction data acquisition processing unit 102, a reconstruction data transfer unit 103, and a storage unit 104.

The printer controller 2 comprises are construction data extraction unit 201, a reconstruction data transfer unit 202, a reconstruction data acquisition processing unit 203, a profile set reconstruction unit 204, and a storage unit 205.

The backup/reconstruction instructing unit 101 of the PC 1 issues an instruction to the printer controller 2 instructing either backup of the profile set (hereinafter simply referred to as "backup") or reconstruction of the profile set (hereinafter simply referred to as "reconstruction") is to be executed.

Moreover, the backup/reconstruction instructing unit 101 instructs the printer controller 2 to extract (e.g., calculate) from the profile set the data that enables reconstruction of the profile set (hereinafter referred to as "reconstruction data"), and to transfer the extracted reconstruction data to the PC 1.

It is made possible here to select either one of the two backup methods; the size prioritized data that prioritizes the minimization of the data size, and the reconstruction speed prioritized data that prioritizes the minimization of the time required for the profile set reconstruction. Specifically, the backup/reconstruction instructing unit 101 selects either the size prioritized reconstruction data or the reconstruction speed prioritized reconstruction data, and instructs the printer controller 2 to extract the selected reconstruction data from the profile set and to transfer the extracted reconstruction data to the PC 1.

Since the data size of the reconstruction data can be made smaller than the profile set, the data amount to be stored in the storage unit (storage device) 104 can be made smaller by backing up in the reconstruction data format than backing up the profile set itself. Since it is possible to select either the size reduction or the reconstruction speed reduction by selecting the size prioritized data or the reconstruction speed data as the reconstruction data, it is possible to optimize the reconstruction data depending on the situation.

The reconstruction data acquisition processing unit 102 executes the process of receiving the reconstruction data transferred from the printer controller 2 and storing it in the storage unit 104 in case of backup.

The reconstruction data transferring unit 103 transfers the reconstruction data that is stored in the storage unit 104 of the PC 1 to the printer controller 2 in case of reconstruction.

The reconstruction data transferred from the printer controller 2 is stored in the storage unit 104.

Moreover, the program ("profile set storage program") to be executed in order to cause the PC 1 to back up or reconstruct the data can be stored in the storage unit 104.

By the reconstruction data being stored in the storage unit 12 of the PC 1 which is an external device of the printer controller 2 (or MFP), the profile set can be quickly restored in case when the storage unit (e.g., HDD (Hard Disk Drive)) of the MFP is damaged and replaced with a new HDD.

By the backup being carried out by storing the reconstruction data in the outside of the MFP (e.g., the storage unit 104 of the PC 1) or the inside of the MFP (e.g., the storage unit 205 of the printer controller 2), the backed up reconstruction data can be used in case when another MFP of the same kind is added without preparing the profile set for the particular MFP, so that the same profile set as the one for the existing MFP can be quickly registered and used.

The reconstruction data extraction unit 201 of the printer controller 2 extracts either the size prioritized reconstruction data or the reconstruction speed prioritized reconstruction data from the profile set according to the backup method specified by the backup/reconstruction instructing unit 101 of the PC 1.

The reconstruction data transfer unit 202 transfers the reconstruction data extracted by the reconstruction data extraction unit 201 to the PC 1.

The reconstruction data acquisition processing unit 203 receives the reconstruction data transferred from the PC 1, executes, and stores it in the storage unit 205 in case of reconstruction.

The profile set reconstruction unit 204 reconstructs (e.g., calculates) the profile set based on the reconstruction data received from the reconstruction data acquisition processing unit 203.

The reconstruction data transferred from the PC 1 and the profile sets are stored in the storage unit 205.

Moreover, the program ("profile set storage program") to be executed in order to cause the printer controller 2 to perform a process to back up or reconstruct the data can be stored in the storage unit 205.

Figure 7:
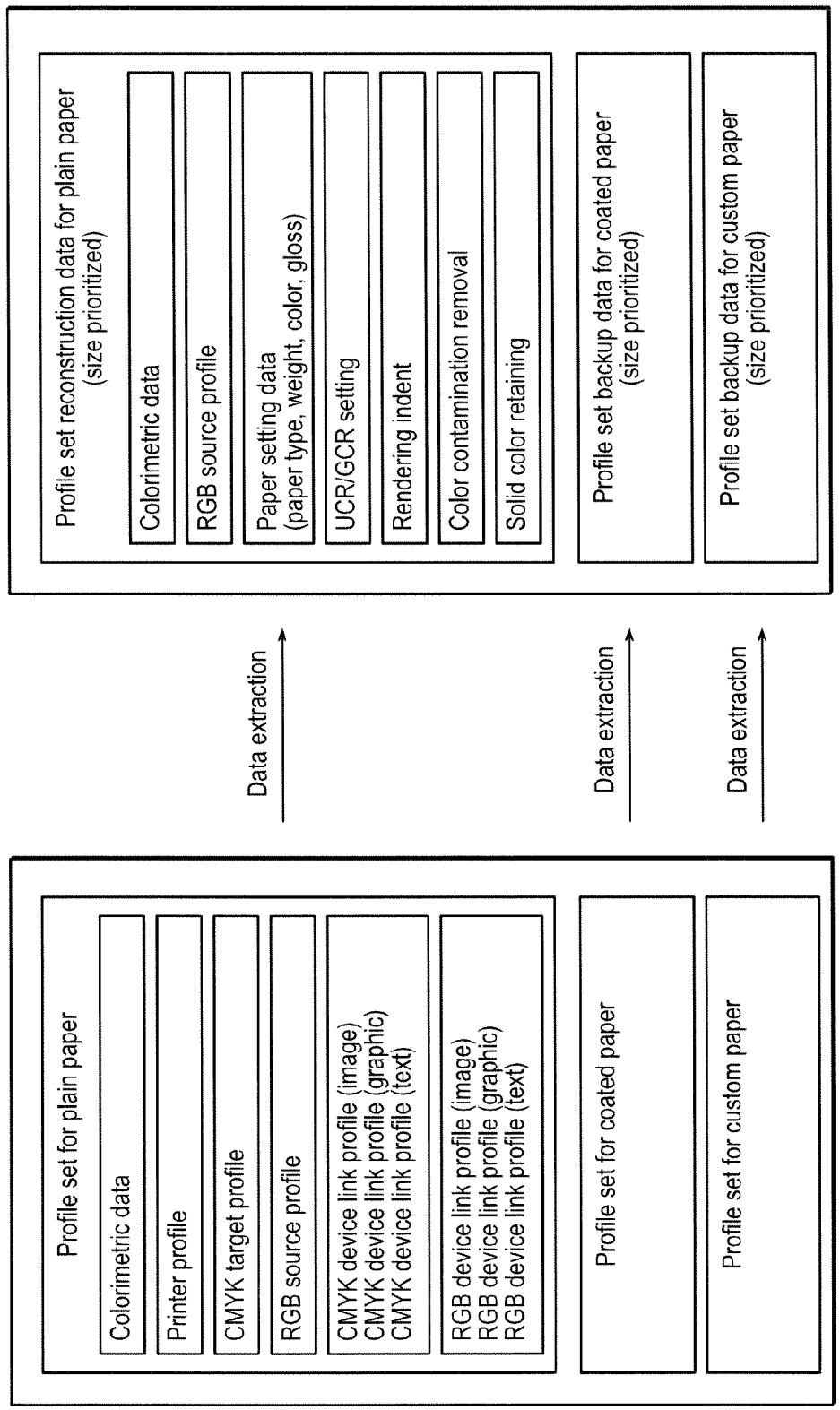
FIG. 7 is an explanatory diagram showing the detail of the size prioritized data of reconstruction data.
Figure 8:
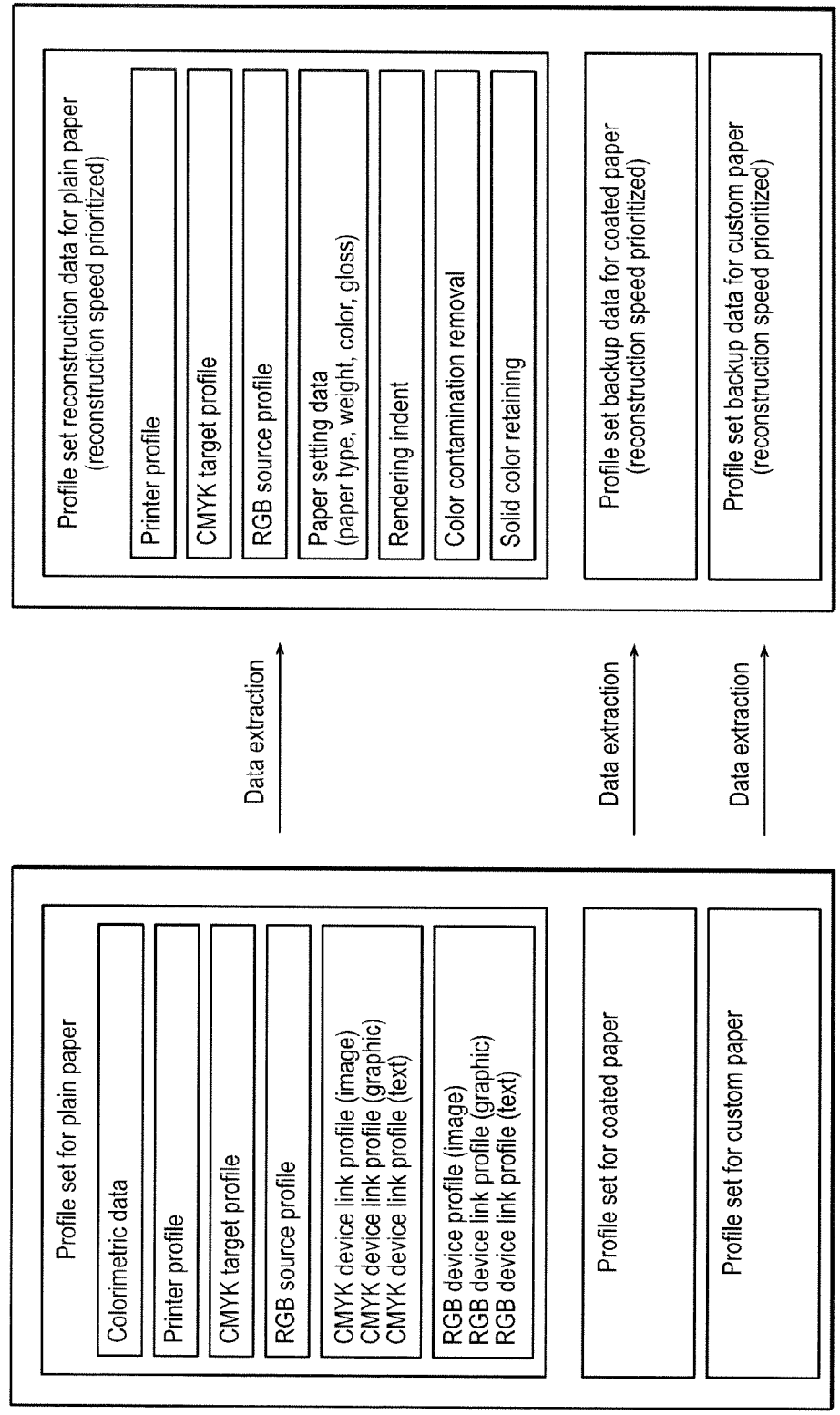
FIG. 8 is an explanatory diagram showing the detail of the reconstruction speed prioritized data of reconstruction data.

FIG. 7 is an explanatory diagram showing the detail of the size prioritized data of reconstruction data. FIG. 8 is an explanatory diagram showing the detail of the reconstruction speed prioritized data of reconstruction data.

As shown in FIG. 7, the profile set is prepared for each sheet of paper. In other words, the profile set is prepared suitable for each type of paper, e.g., plain paper, coated paper and custom paper.

Each profile set comprises colorimetric data, a printer profile, a CMYK target profile, an RGB source profile, three CMYK device link profiles (hereinafter referred to as "CMYK DLP"), and three RGB device link profiles (hereinafter referred to as "RGB DLP"). The colorimetric data may comprise a plurality of kinds, e.g., two kinds of them; printer profile colorimetric data used for generating the printer profile, and a CMYK target profile colorimetric data used for generating a CMYK target profile. The printer profile is a file describing the characteristics of the printer and the paper and contains the information for extracting a paper setting data and the data concerning a UCR/GCR setting for printer profile. The CMYK target profile is a color conversion profile used for the color conversion process of the CMYK type image data, and contains the information for extracting a data concerning UCR/GCR setting for the CMKY target. The RGB source profile is the color conversion profile used for the color conversion process of the RGB type image data. The CMYK DLP is the color conversion profile used for the color conversion process of the CMYK type image data that enables a direct color conversion process between an input device and an output device, and contains the information for extracting each setting data of rendering intent, color contamination removal, and solid color retaining. The RGB DLP is the color conversion profile used for the color conversion process of the RGB type image data, and enables a direct color conversion process between an input device and an output device, and contains the information for extracting each setting data of rendering intent, color contamination removal, and solid color retaining applied to this direct color conversion process.

The reconstruction data is generated for the backup of these profile set, and is generated for each profile set based on the particular profile set. In other words, the reconstruction data is generated by extracting the data that makes it possible to reconstruct the profile set from the particular profile set.

The profile set reconstructed based on the reconstruction data can match completely with the original profile set (i.e., the profile set from which the reconstruction data is extracted).

The present embodiment can be applied to any profile set that satisfies the following conditions. Specifically, (1) the printer profile and the CMYK target profile have to be generated from the colorimetric data, and (2) the CMYK DLP and the RGB DLP have to be generated from the printer profile as specified in (1) and the CMYK target profile.

In the present embodiment, the size prioritized data to be extracted from the profile set can be the colorimetric data used for generating the printer profile, the colorimetric data used for generating the CMYK target profile, the RGB source profile, the paper setting data, UCR/GCR setting data for the printer profile, the UCR/GCR setting data for the CMYK target, and the setting data for rendering intent, color contamination removal, and solid color retaining applied to this direct color conversion process for each device link profile. In case of such a size prioritized data, the size of each size prioritized data for each paper is approximately 400 kB per sheet of paper. Since the size of each profile set according to the present embodiment is approximately 10 MB per sheet, the data size can be reduced to approximately 4%.

The size prioritized data can be constituted of only the data necessary for the reconstruction of the profile set. Thus, the size of the size prioritized data can be minimized. The data necessary for the reconstruction can be modified according to the printing quality required by the MFP. In other words, the size prioritized data can be constituted of only the colorimetric data, or can be constituted of the colorimetric data for the printer profile, the colorimetric data for the target profile, and the RGB source profile.

As shown in FIG. 8, the reconstruction speed prioritized data extracted from the profile set can be the the printer profile, the CMYK target profile, the RGB source profile, the paper setting data, and the setting data for rendering intent, color contamination removal, and solid color retaining for each device link profile. In this case, the size of each size prioritized data for each paper is reduced to approximately 3 MB per sheet of paper. Although it is larger than the size prioritized data as the size of the reconstruction data, the reconstruction time itself can be reduced as the amount of calculation required for reconstruction can be reduced compared to that for the size prioritized data.

For example, when Pentium 4 processors with a clock frequency of 3.4 GHz and a 1 GB memory is used as an arithmetic asset, the reconstruction of one profile set based on the size prioritized data took approximately two minutes, while the same based on the reconstruction speed prioritized data took 10 seconds.

The data to be included in the reconstruction speed prioritized data can also be modified depending on the printing quality required by the MFP. For example, the reconstruction speed prioritized data can be constituted of the printer profile, the CMYK target profile, and the RGB source profile.

Figure 9A:
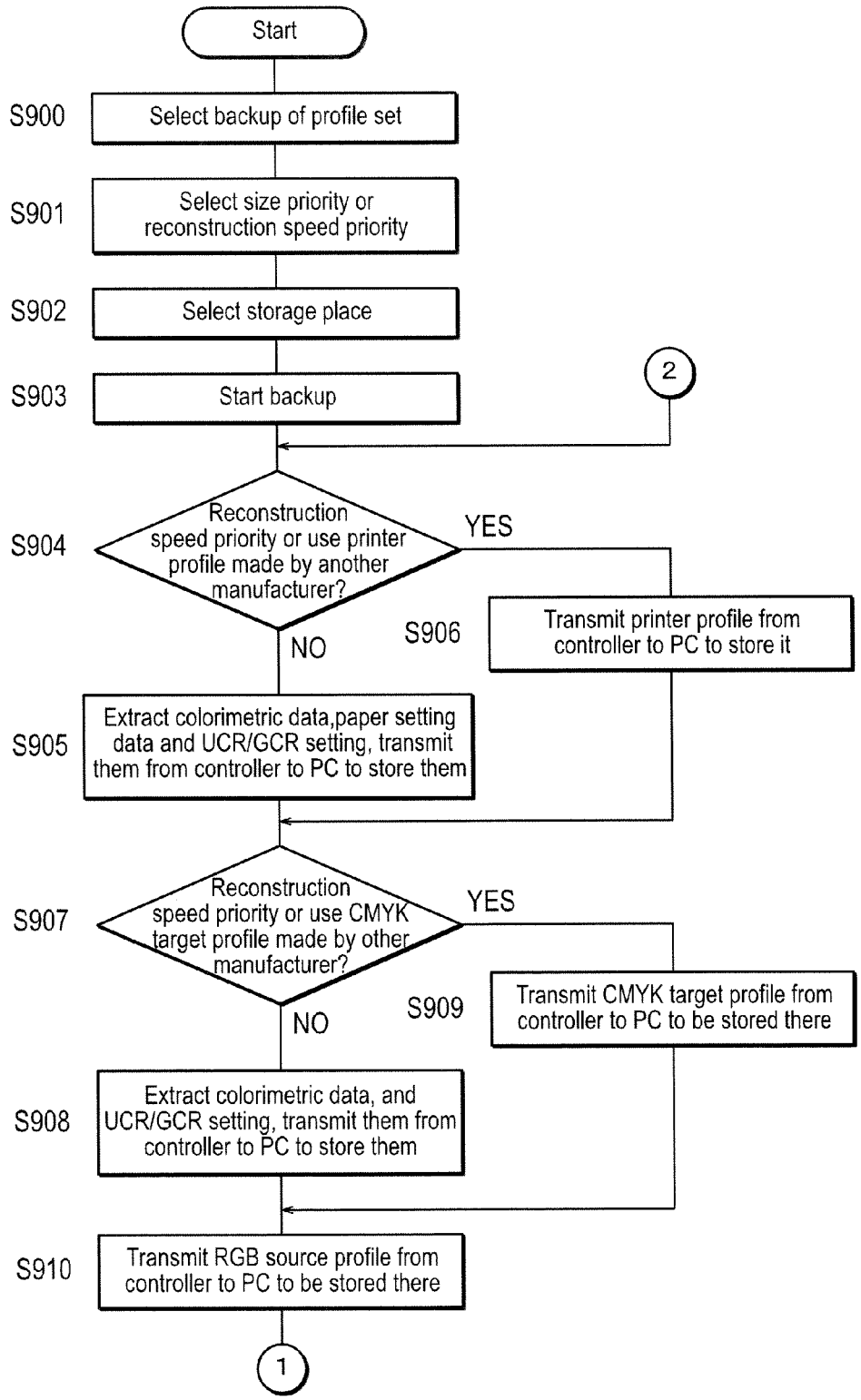
FIG. 9A is a flowchart for describing the backup process of the profile set.
Figure 9B:
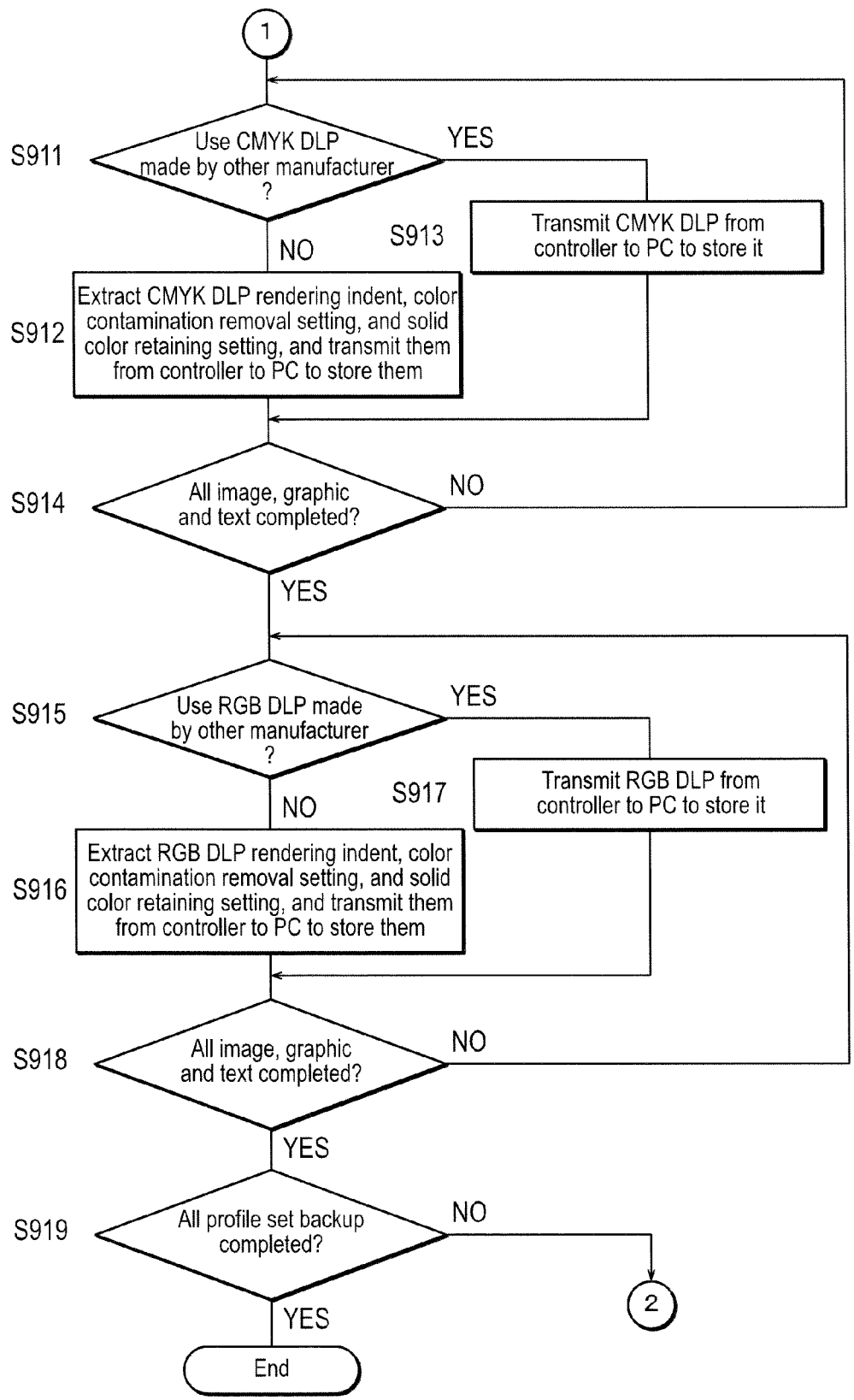
FIG. 9B is a flowchart for describing the backup process of the profile set.

FIG. 9A and FIG. 9B is a flowchart for describing the backup process of the profile set. This flowchart can be implemented by the program executed by the PC 1.

The PC 1 displays the GUI (Graphical User Interface) for selecting either the backup or the reconstruction of the profile set, where the user selects the backup of the profile set in order to start the backup (S900).

Figures 10, 11:
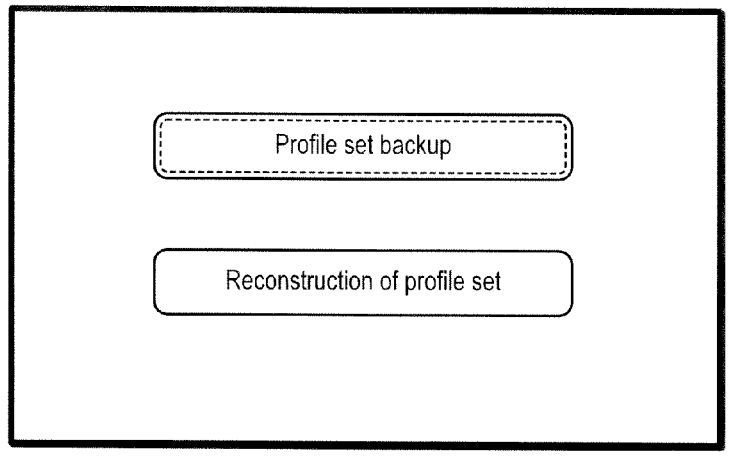
FIG. 10 is a diagram showing a GUI for selecting either the backup or reconstruction of the profile set.
FIG. 11 is a diagram showing a GUI for selecting either the size prioritized or reconstruction speed prioritized as the backup method.

FIG. 10 is a diagram showing a GUI for selecting either the backup or the reconstruction of the profile set. The GUI displays the buttons for the reconstruction and the backup of the profile set, and the user can select the backup of the profile set by pressing the button for the backup of the profile set.

The PC 1 allows the user to select either the size prioritized data or the reconstruction speed prioritized data as the reconstruction data for the backup on the GUI (S901).

FIG. 11 is a diagram showing a GUI for selecting either the size prioritized or reconstruction speed prioritized method as the backup method. The GUI shown in this figure appears when the button for the backup of the profile set is pressed on the GUI shown on FIG. 10.

The GUI displays radio buttons for the selection of either the size priority or the reconstruction speed priority as the backup method, so that pushing on the radio button for the size priority causes the size priority to be selected as the backup method and causes the size prioritized data to be selected as the reconstruction data. On the other hand, pushing on the radio button for the reconstruction speed priority causes the reconstruction speed priority to be selected as the backup method and causes the reconstruction speed prioritized data to be selected as the reconstruction data.

The PC 1 allows the user to select a storage place in the PC 1 for the reconstruction data to be backed up (S902).

The GUI of FIG. 11 further displays the reference button for specifying the storage place in the PC 1 for the reconstruction data to be backed up. It is also possible to constitute in such a way that pressing the reference button causes the storage destination selection screen (not shown) according to a common folder selection dialog to be displayed, so that the storage destination can be selected on the storage destination selection screen to cause the selected storage destination to be reflected on the GUI screen of FIG. 11.

The PC 1 starts the backup process as the start button of the GUI of FIG. 11 is pressed (S903).

In case when the reconstruction speed prioritized is not selected as backup method and also a printer profile of another manufacturer is not used (S904: No), the PC 1 requests the printer controller 2 to extract the colorimetric data for printer profile, the paper setting data, and the UCR/GCR setting data for the printer profile from the profile set stored in the printer controller 2 and transfer them to the PC 1. The PC 1 stores these data transferred from the printer controller 2 into the storage unit 104 (S905).

In case when the reconstruction speed prioritized is selected as backup method or a printer profile of another manufacturer is used (S904: Yes), the PC 1 requests the printer controller 2 to transfer the printer profile data stored in the printer controller 2 to the PC 1. The PC 1 stores these data transferred from the printer controller 2 into the storage unit 104 (S905).

In case when the reconstruction speed prioritized is not selected as backup method and also the CMYK target profile of another manufacturer is not used (S907: No), the PC 1 requests the printer controller 2 to extract the colorimetric data for CMYK target and the data concerning UCR/GCR setting for CMYK target from the profile set stored in the printer controller 2 and transfer them to the PC 1. The PC 1 stores these data transferred from the printer controller 2 into the storage unit 104 (S908).

In case when the reconstruction speed prioritized is selected as backup method or the CMYK target profile of another manufacturer is used (S907: Yes), the PC 1 requests the printer controller 2 to transfer the CMYK target profile stored in the printer controller 2 to the PC 1. The PC 1 stores the CMYK target profile (i.e., the reconstruction speed prioritized data) transferred from the printer controller 2 into the storage unit 104 (S909).

The PC 1 requests the printer controller 2 to transfer the RGB source profile, and the RGB source profile is transferred to the PC 1 from the printer controller 2 by the request of the PC 1. The PC 1 stores the RGB source profile into the storage unit 104 (S910).

In case when the CMYK DLP made by another manufacturer is not used (S911: No), the PC 1 requests the printer controller 2 to extract the data concerning CMYK DLP rendering intent, color contamination removal setting, and solid color retaining setting from the profile set stored in the printer controller 2, and transfer them to the PC 1. The PC 1 stores these data transferred from the printer controller 2 into the storage unit 104 (S912).

In case a CMYK DLP made by another manufacturer is to be used (S911: Yes), the PC 1 requests the printer controller 2 to transfer the CMYK DLP stored in the printer controller 2 to the PC 1. The PC 1 stores the CMYK DLP transferred from the printer controller 2 into the storage unit 104 (S913).

The PC 1 repeats the steps S911 to S913 until the backup of all the images, graphics and texts of the profile set is completed (S914).

In case when the RGB DLP made by another manufacturer is not used (S915: No), the PC 1 requests the printer controller 2 to extract the data concerning RGB DLP rendering intent, color contamination removal setting, and solid color retaining setting data from the profile set stored in the printer controller 2, and transfer them to the PC 1. The PC 1 stores these data transferred from the printer controller 2 into the storage unit 104 (S916).

In case a RGB DLP made by another manufacturer is to be used (S915: Yes), the PC 1 requests the printer controller 2 to transfer the RGB DLP stored in the printer controller 2 to the PC 1. The PC 1 stores the RGB DLP transferred from the printer controller 2 into the storage unit 104 (S917).

The PC 1 repeats the steps S915 to S917 until the backup of all the images, graphics and texts of the profile set is completed (S914).

The PC 1 repeats the steps S904 to S918 until the backup of all the profile sets for each type of paper is completed (S919).

Figure 12B:
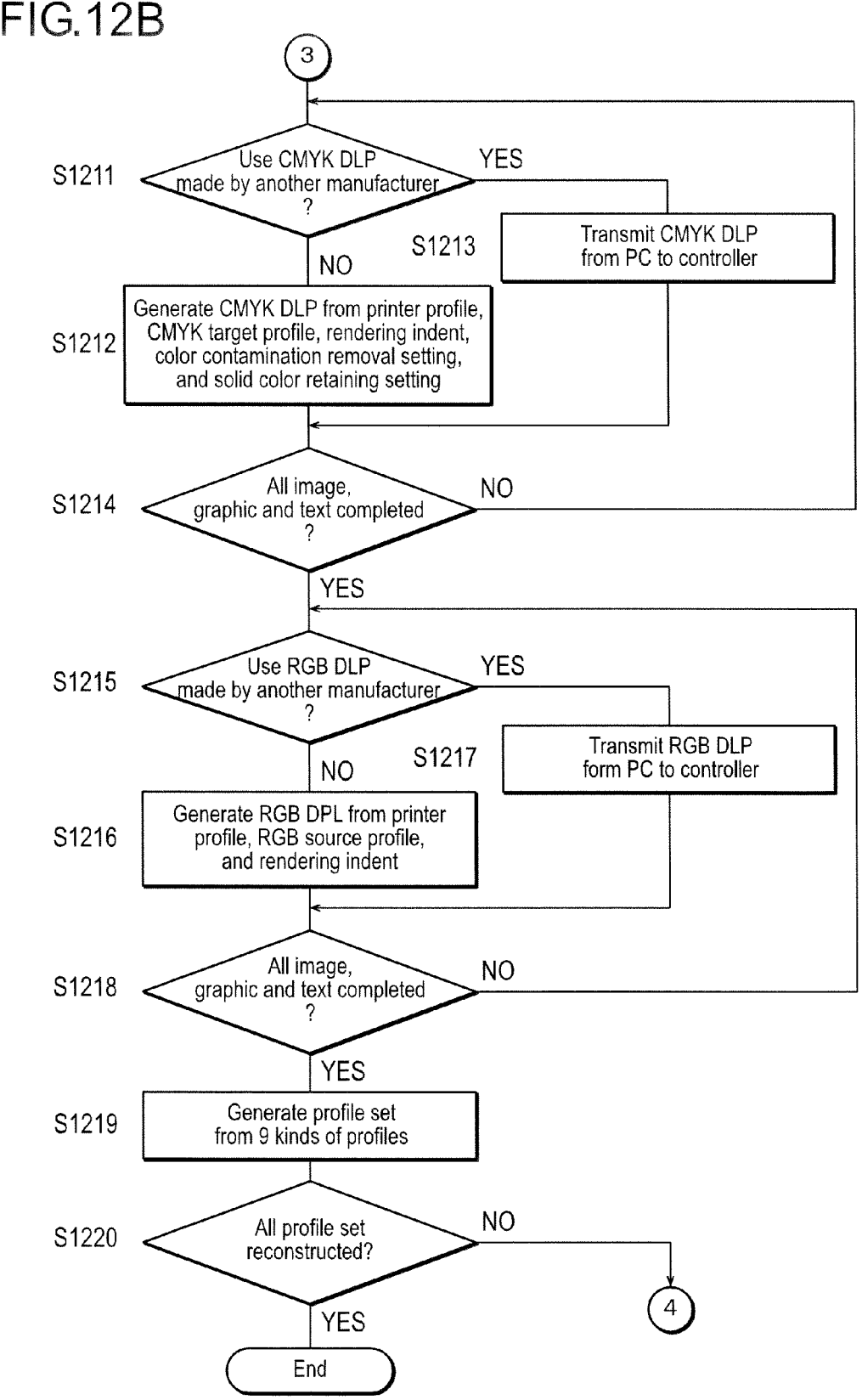
FIG. 12B is a flowchart for describing the reconstruction process of the profile set.

FIG. 12A and FIG. 12B is a flowchart for describing the reconstruction process of the profile set. This flowchart can be implemented by the program executed by the PC 1. The description of the reconstruction process which are identical to those in the backup process are omitted here in order to avoid duplication.

The PC 1 displays the GUI for selecting either the backup or the reconstruction of the profile set, where the user selects the reconstruction of the profile set in order to start the reconstruction (S1200).

The PC 1 prompts the user to select the reconstruction data to be used in the reconstruction of the profile set from the storage place within the PC 1 (S1201).

The PC 1 transfers the reconstruction data selected in the step S1201 to the controller 2 (S1202), and starts the reconstruction of the profile set in the printer controller 2 (S1203).

In case when the reconstruction speed prioritized is not selected as backup method and also a printer profile of another manufacturer is not used (S1204: No), the PC 1 transfers the colorimetric data for printer profile, the paper setting data, and the UCR/GCR setting data for printer profile to the printer controller 2. The printer controller 2 reconstructs the printer profile based on the data transferred from the PC 1 (S1205).

In case when the reconstruction speed prioritized is selected as backup method or a printer profile of another manufacturer is used (S1204: Yes), the PC 1 transfers the printer profile data to the printer controller 2 (1206).

In case when the reconstruction speed prioritized is not selected as backup method and also a CMYK target profile of another manufacturer is not used (S1207: No), the PC 1 transfers the colorimetric data for CMYK target and the data concerning UCR/GCR setting for CMKY target to the printer controller 2. The printer controller 2 reconstructs the CMYK target profile based on the data transferred from the PC 1 (S1208).

In case when the reconstruction speed prioritized is selected as backup method or a CMYK target profile of another manufacturer is used (S1207: Yes), the PC 1 transfers the CMYK target profile (i.e., the reconstruction speed prioritized data) to the printer controller 2 (S1209).

The PC 1 transfers the RGB source profile (i.e., the size prioritized data or the reconstruction speed prioritized data) to the printer controller 2 (S1210).

In case when the CMYK DLP made by another manufacturer is not used (S1211: No), the PC 1 transfers the data concerning rendering intent, color contamination removal setting, and solid color retaining setting data to the printer controller 2. The CMYK DLP is reconstructed in the printer controller 2 based on the printer profile reconstructed or transferred from the PC 1 (S1204-S1206), the CMYK target profile reconstructed or transferred from the PC 1 (S1207-S1209), and the data concerning rendering intent, color contamination removal setting, and solid color retaining setting (i.e., the size prioritized data or the reconstruction speed prioritized data) transferred from the PC 1 (S1212).

In case when the CMYK DLP made by another manufacturer is used (S1211: Yes), the CMYK DLP is transferred to the printer controller 2 (S1213).

The PC 1 repeats the steps S1211-S1213 until the reconstruction of all the images, graphics and texts of the profile set is completed (S1214).

In case when the RGB DLP made by another manufacturer is not used (S1215: No), PC 1 transfers the rendering intent to the printer controller 2. The RGB DLP is reconstructed in the printer controller 2 based on the printer profile reconstructed or transferred from the PC 1 (S1204-S1206), the RGB source profile transferred from the PC 1 (S1210), and the rendering intent (i.e., the size prioritized data or the reconstruction speed prioritized data) (S1216).

In case when the RGB DLP made by another manufacturer is used (S1215: Yes), the PC 1 transfers the RGB DLP to the printer controller 2 (S1217).

The PC 1 repeats the steps S1215 to S1217 until the backup of all the images, graphics and texts of the profile set is completed (S1218).

In the printer controller 2, the profile set is generated from nine kinds of profiles (S1219).

The PC 1 repeats the steps S1202 to S1219 until the reconstruction of all the profile sets for each paper is completed (S1220).

Figure 13:
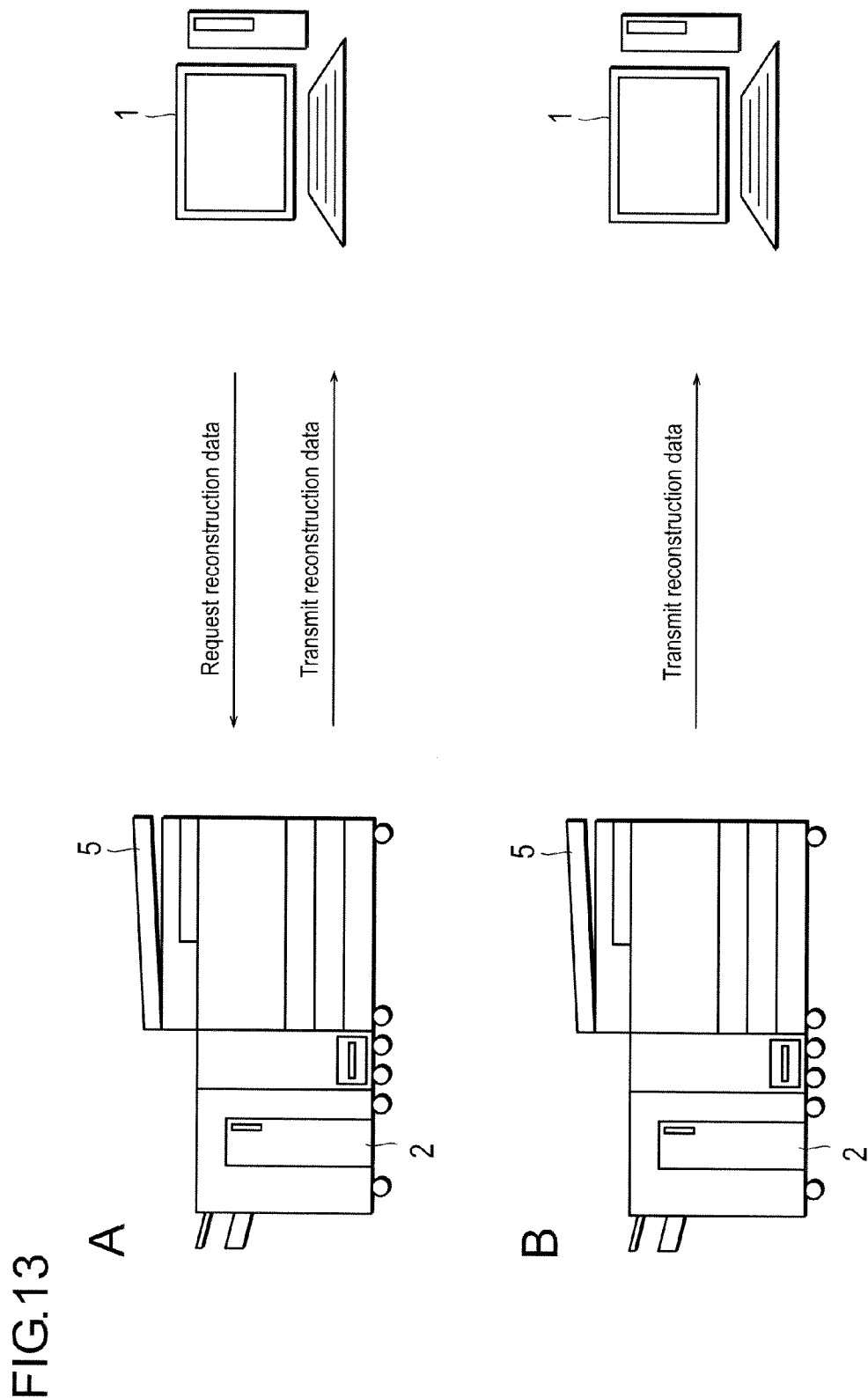
FIG. 13 is a explanatory diagram for sending/receiving the reconstruction data between the PC 1 and the printer controller 2 during the backup of the profile set.

FIG. 13 is a explanatory diagram for sending/receiving the reconstruction data between the PC 1 and the printer controller 2 during the backup of the profile set. In this figure, the printer controller 2 is shown as a part of the MFP 5.

FIG. 13A shows a method where the PC 1 requests the printer controller 2 to generated reconstruction data and the PC 1 receives (downloads) the reconstruction data generated by the printer controller 2. In this case, as shown in the flowchart of FIG. 9A and FIG. 9B, the backup can be implemented using the program that causes the PC 1 to execute the action for backup.

FIG. 13B shows a method where the printer controller 2 generates reconstruction data and sends (uploads) the generated reconstruction data to the PC 1. In this case, the backup can be implemented using the program that causes the printer controller 2 to execute the action for backup.

FIG. 14 is a explanatory diagram for sending/receiving the profile set between the PC 1 and the printer controller 2 during the backup of the profile set. In this figure, same as in FIG. 13, the printer controller 2 is shown as a part of the MFP 5.

FIG. 14A shows a method where the PC 1 requests the printer controller 2 to transfer the profile set, and the PC 1 generates the reconstruction data based on the profile set the PC 1 received (downloaded), and stores it. In this case, the backup can be implemented using the program that causes the PC 1 to execute the action for backup.

FIG. 14B shows a method where the printer controller 2 transmits (uploads) the profile set to the PC 1, and the PC 1 generates the reconstruction data based on the profile set received from the printer controller 2, and stores it. In this case, the backup can be implemented using the program that causes the printer controller 2 to execute the action for backup.

While the above is the description of the method of storing the profile set, the computer readable recording medium with the profile set storage program, the profile set storage system, and the color conversion process device in accordance with the embodiments of the present invention, these embodiments have effects as follows.

It extracts the reconstruction data from the profile set, generates the backup of the profile set, and optimizes the reconstruction data to be extracted by prioritizing either the size reduction or the reconstruction speed. Thus, it can reduce the data amount to be stored in the storage device and reduce the time required for the reconstruction of the profile set.

The reduction of the time required for the backup can be realized by reducing the data transmission time by transmitting the reconstruction data extracted from the profile set to the storage device at the destination for the backup.

Since the backup is made by storing the reconstruction data in a device outside of the MFP separate from the printer controller, the profile set can be quickly restored in case when the HDD of the MFP is damaged and replaced with a new HDD, etc.

If the backup of the profile set is made using the reconstruction data, the backed up reconstruction data can be used without preparing the profile set for a particular MFP in case another MFP of the same kind is added, so that the same profile set as the one for the existing MFP can be quickly registered and used.

Although the present invention was described in the above using an embodiment, the present invention should not be construed to be limited to the above embodiment.

For example, although backup and reconstruction of the profile set are done using a program in the embodiment, a portion of or the entire the program can be replaced with hardware.

Also, the order of the steps S904 through S918 in the present embodiment can be arbitrarily selected. For example, they can be implemented in parallel. The same thing applies to the steps S1202 through S1218.

The storage place of the reconstruction data for the backup does not necessarily have to be located outside of the MFP, rather it can be located within the MFP.

The profile set can also be backed up treating a portion of the profile set as the size prioritized data and the rest as the reconstruction speed prioritized data.

What is claimed is:

1. A method of storing a profile set comprising:
   (a) selecting a type of reconstruction data that enables to reconstruct a profile set having at least one kind of color conversion profile for converting color of an image, the type of reconstruction data selected between size prioritized data and reconstruction speed prioritized data, said size prioritized data being smaller than said profile set, said reconstruction speed prioritized data enables reconstruction of said profile set within a shorter time period as compared to reconstruction using said size prioritized data, wherein said reconstruction speed prioritized data is smaller than said profile set and is larger than said size prioritized data;
   (b) generating reconstruction data based on said profile set and said type of reconstruction data selected in step (a), wherein said reconstruction data enables construction of a reconstructed profile set that matches said profile set; and
   (c) storing said reconstruction data generated in said step (b) into a storage device.

2. The method of storing a profile set as claimed in claim 1 further comprising:
   performing either a step (d1) or step (d1), step (d1) including transferring said profile set to said storage device prior to said step (b), step (d2) including transferring the reconstruction data generated in said step (b) to said storage device prior to said step (c).

3. The method of storing a profile set as claimed in claim 1, wherein
   said size prioritized data includes colorimetric data for printer profile, colorimetric data for CMYK target profile, and RGB source profile.

4. The method of storing a profile set as claimed in claim 1, wherein
   said reconstruction speed prioritized data includes printer profile, CMYK target profile, and RGB source profile.

5. The method of storing a profile set as claimed in claim 1 further comprising:
   (e) constructing a reconstructed profile set that matches said profile set, said constructing based on said reconstruction data stored in said storage device in said step (c).

6. A color conversion process device comprising:
   a reconstruction data selecting unit enables to select a type of reconstruction data that enables to reconstruct a profile set having at least one kind of color conversion profile for converting color of an image, said reconstruction data selecting unit enables the selection of the type between size prioritized data and reconstruction speed prioritized data, said size prioritized data being smaller than said profile set, said reconstruction speed prioritized data enables reconstruction of said profile set within a shorter time period as compared to reconstruction using said size prioritized data, wherein said construction speed prioritized data is smaller than said profile set and is larger than said size prioritized data;
   a reconstruction data generating unit for generating reconstruction data based on said profile set and said type of reconstruction data selected from said reconstruction data selecting unit, wherein said reconstruction data enables construction of a reconstructed profile set that matches said profile set; and
   a reconstruction data transfer unit for transferring the reconstruction data generated by said reconstruction data generating unit to a storage unit of a transfer destination.

7. The color conversion process device as claimed in claim 6, wherein
   the data at least required for said reconstruction includes colorimetric data for printer profile, colorimetric data for CMYK target profile, and RGB source profile.

8. The color conversion process device as claimed in claim 6, wherein
   said reconstruction speed prioritized data includes printer profile, CMYK target profile, and RGB source profile.

9. The color conversion process device as claimed in claim 6 further comprising:

a profile set reconstruction unit for receiving said reconstruction data stored in said storage device, and for constructing, based on said reconstruction data received, a reconstructed profile set that matches said profile set.

10. A non-transitory computer readable storage medium stored with a profile set storage program to be executed by a client computer, said program causing a computer to execute a process comprising:
   (a) selecting a type of reconstruction data that enables to reconstruct a profile set having at least one kind of color conversion profile for converting color of an image, the type of reconstruction data selected between size prioritized data and reconstruction speed prioritized data, said size prioritized data being smaller than said profile set, said reconstruction speed prioritized data enables reconstruction of said profile set within a shorter time period as compared to reconstruction using said size prioritized data, wherein said reconstruction speed prioritized data is smaller than said profile set and is larger than said size prioritized data;
   (b) performing either step (b1) or step (b2), step (b1) including generating reconstruction data based on said profile set and said type of reconstruction data selected in step (a), and step (b2) including requesting a color conversion process device to generate reconstruction data based on said profile set and said type of reconstruction data selected in step (a) and receiving said reconstruction data generated by said color conversion process device; and
   (c) storing said reconstruction data generated or received in said procedure (b) into a storage device, wherein said reconstruction data enables construction of a reconstructed profile set that matches said profile set.

11. The non-transitory computer readable storage medium as claimed in claim 10, wherein said process further comprises:
   (e) transmitting said reconstruction data stored into said storage device in said procedure (c) to said color conversion process device, and requesting said color conversion process device to construct, based on said reconstruction data transmitted, a reconstructed profile that matches said profile set.

12. A non-transitory computer readable storage medium stored with a profile set storage program to be executed by the color conversion process device, said program causing a computer to execute a process comprising:
   (a) selecting a type of reconstruction data that enables to reconstruct a profile set having at least one kind of color conversion profile for converting a color of an image, the type of reconstruction data selected between size prioritized data and reconstruction speed prioritized data, said size prioritized data being smaller than said profile set, said reconstruction speed prioritized data enables reconstruction of said profile set within a shorter time period as compared to reconstruction using said size prioritized data, wherein said reconstruction speed prioritized data is smaller than said profile set and is larger than said size prioritized data;
   (b) performing either step (b1) or step (b2), step (b1) including generating reconstruction data based on said profile set and said type of reconstruction data selected in step (a) and transmitting said reconstruction data to a client computer, and step (b2) including requesting a client computer to generate reconstruction data based on said profile set and said type of reconstruction data selected in step (a); and
   (c) requesting a storage device of said client computer to store said reconstruction data transmitted to said client computer in step (b1) or generated by said client computer in step (b2), wherein said reconstruction data enables construction of a reconstructed profile set that matches said profile set.

13. The non-transitory computer readable storage medium as claimed in claim 12, wherein said process further comprises:
   receiving said reconstruction data stored in said storage device in said step (c), and constructing, based on said reconstruction data, a reconstructed profile set that matches said profile set.

14. A profile set storage system comprising a client computer and a color conversion process device connected with each other to allow bidirectional communications,
   wherein said client computer comprises:
      a reconstruction data selecting unit enables to select a type of reconstruction data that enables to reconstruct a profile set having at least one kind of color conversion profile for converting color of an image, said reconstruction data selecting unit enables selection of the type between size prioritized data and reconstruction speed prioritized data, said size prioritized data being smaller than said profile set, said reconstruction speed prioritized data enables reconstruction of said profile set within a shorter time period as compared to reconstruction using said size prioritized data, wherein said reconstruction speed prioritized data is smaller than said profile set and is larger than said size prioritized data;
      a reconstruction data receiving unit for requesting said color conversion process device to generate reconstruction data based on said profile set and said type of reconstruction data selected by said reconstruction data selecting unit and for receiving said reconstruction data generated by said color conversion process device, wherein said reconstruction data enables construction of a reconstructed profile set that matches said profile set; and
      a storage unit for storing said reconstruction data received by said reconstruction data receiving unit, and
   wherein said color conversion process device comprises:
      a reconstruction data generating unit for generating said reconstruction data in accordance with said request of the client computer; and
      a first reconstruction data transmission unit for transmitting said reconstruction data generated by said reconstruction data generating unit to said client computer.

15. The profile set storage system as claimed in claim 14, wherein
   said client computer further comprises a second reconstruction data transmission unit for transmitting said reconstruction data stored in said storage unit to said color conversion process device, and for requesting construction of a reconstructed profile set based on said reconstruction data transmitted, and
   said color conversion process device further comprises a profile set reconstruction unit for constructing said reconstructed profile set based on said reconstruction data received from said second reconstruction data transmission unit.

* * * * *